M. NESINE.
WHEEL HUB CAP.
APPLICATION FILED MAR. 22, 1915.
1,147,746.
Patented July 27, 1915.
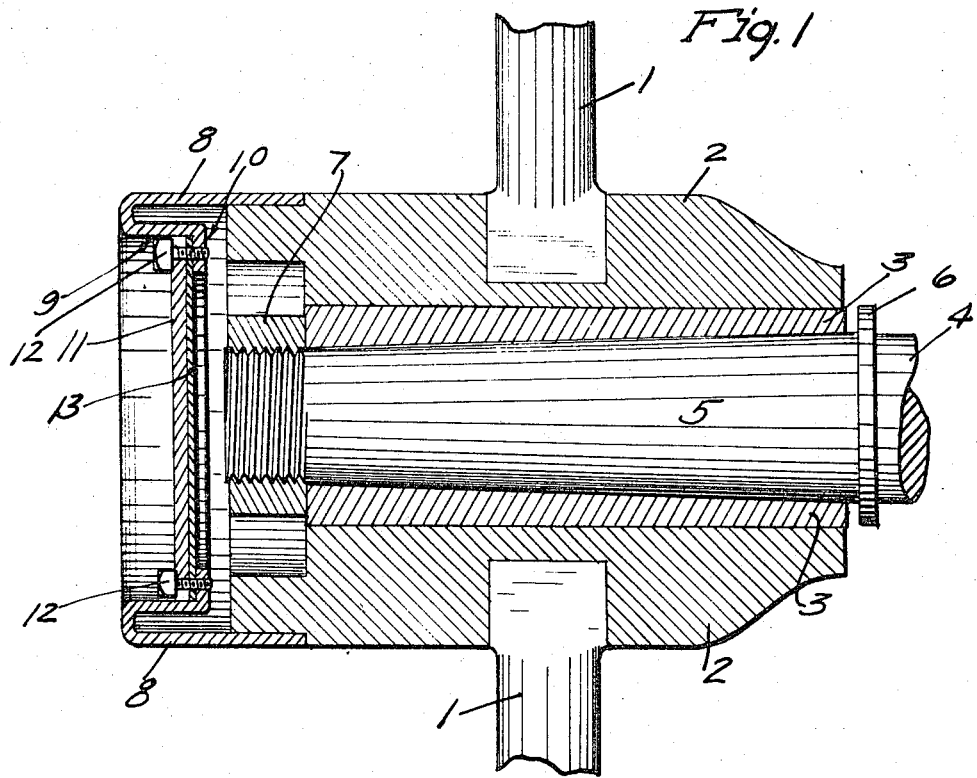
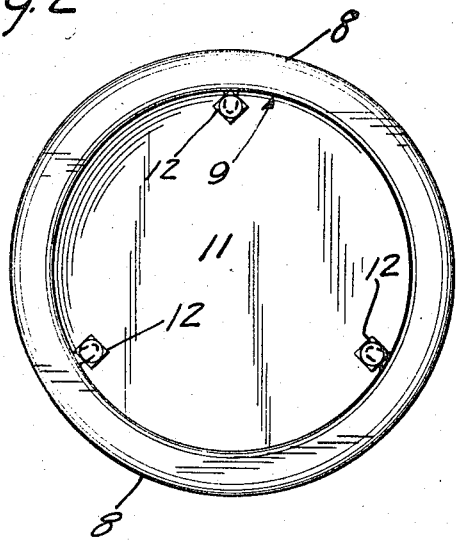
WITNESSES
E. C. Skinkle
A. H. Opsahl
INVENTOR
Max Nesine
BY HIS ATTORNEYS
Williamson Merchant

UNITED STATES PATENT OFFICE.

MAX NESINE, OF MINNEAPOLIS, MINNESOTA.

WHEEL-HUB CAP.

1,147,746.  Specification of Letters Patent.  Patented July 27, 1915.

Application filed March 22, 1915.  Serial No. 16,035.

*To all whom it may concern:*

Be it known that I, MAX NESINE, a citizen of the United States, residing at Minneapolis, in the county of Hennepin and State of Minnesota, have invented certain new and useful Improvements in Wheel-Hub Caps; and I do hereby declare the following to be a full, clear, and exact description of the invention, such as will enable others skilled in the art to which it appertains to make and use the same.

My invention relates to improvements in wheel hub caps; and, to this end, it consists of the novel devices and combinations of devices hereinafter described and defined in the claim.

In the accompanying drawings, which illustrate the invention, like characters indicate like parts throughout the several views.

Referring to the drawings: Figure 1 is a view principally in central section taken through a wheel hub and journal, having applied thereto the improved hub cap; and Fig. 2 is an end elevation of the improved hub cap.

Of the parts of the wheel and axle illustrated for the purpose of showing the invention applied in working position, it is only necessary to note the spokes 1, hub 2, bushing 3, and axle 4, having a journal 5, mounted in the bushing 3, and provided with a stop flange 6. The outer end of the journal 5 is screw threaded to receive the customary nut 7 which holds the hub 2 on the journal 5.

The body 8 of the improved wheel cap is of cylindrical form, is telescoped onto the reduced outer end portion of the hub 2, and is bent inward upon itself to afford a cylindrical portion 9. This cylindrical portion 9 is concentrically located within the body 8, radially spaced therefrom, and having its inner edge portion bent laterally inward to afford an annular clamping flange 10. The passage way through the cap portion 9 is normally closed by a closure plate or cover 11, seated on the flange 10 within said cylindrical portion 9. Machine screws 12 are passed through apertures in the plate 11 and have screw threaded engagement with the flange 10 for detachably securing the plate 11 thereto. Interposed between the flange 10 and plate 11 is a pliable packing 13.

By reference to Fig. 1, it will be noted that the flange 10 is spaced outward of the wheel hub 2, thereby holding the closure plate 11 in a position to prevent the same from being struck by the journal 5 during end thrusts of the axle 4. It is also important to note that the plate 11 and machine screws 12 are located entirely within the cylindrical portion 9 of the cap, thereby preventing the same from being struck by obstructions, and it also leaves the wheel cap smooth on its outer end surfaces.

The improved hub cap excludes all dust, dirt and water from the wheel journal that is liable to work in from the outer end of the hub. It also excludes the air from the outer end portion of the wheel journal which prevents the lubricating oil from drying up. It also prevents the oil, used in lubricating the journal, from dripping from the hub.

The above described invention is extremely simple and of comparatively small cost to manufacture, and very quickly applied to a wheel hub. In applying the improved cap to old wheels, it is only necessary to remove the outer ferrule and telescope the cap into position in place thereof.

What I claim is:—

A wheel hub cap bent inward upon itself to afford a cylindrical portion having an inturned annular clamping flange, a closure plate seated on said flange, and means for detachably securing said closure plate on said flange, said closure plate and securing means being located entirely inside of said cylindrical portion.

In testimony whereof I affix my signature in presence of two witnesses.

MAX NESINE.

Witnesses:
 EVA E. KÖNIG,
 HARRY D. KILGORE.